United States Patent [19]
Clifton et al.

[11] Patent Number: 5,996,684
[45] Date of Patent: Dec. 7, 1999

[54] RADIATOR AND CONDENSER ASSEMBLY

[75] Inventors: Andrew Clifton, London; Benedict Capaldi, Chelmsford; Ian White, Brentwood, all of United Kingdom

[73] Assignee: Ford Motor Company, Dearborn, Mich.

[21] Appl. No.: 09/180,408

[22] PCT Filed: May 1, 1997

[86] PCT No.: PCT/GB97/01191

§ 371 Date: Jan. 11, 1999

§ 102(e) Date: Jan. 11, 1999

[87] PCT Pub. No.: WO97/42049

PCT Pub. Date: Nov. 13, 1997

[30] Foreign Application Priority Data

May 4, 1996 [GB] United Kingdom .................... 9609440

[51] Int. Cl.[6] ........................................................ F28F 9/00
[52] U.S. Cl. .................................. 165/67; 165/69; 165/4; 165/121; 165/140; 165/DIG. 311; 180/68.4
[58] Field of Search ................................ 165/41, 67, 121, 165/140, DIG. 311; 180/68.4

[56] References Cited

U.S. PATENT DOCUMENTS

| 4,579,184 | 4/1986 | Hiramoto | 180/68.4 |
| 4,651,839 | 3/1987 | Isobe | 180/68.4 |
| 4,773,496 | 9/1988 | Brielmair | 180/68.4 |
| 4,997,033 | 3/1991 | Ghiani et al. | 165/67 |
| 5,219,016 | 6/1993 | Bolton et al. | 165/41 |
| 5,269,367 | 12/1993 | Susa et al. | 165/41 |
| 5,271,473 | 12/1993 | Ikeda et al. | 180/68.4 |
| 5,429,181 | 7/1995 | Tordjeman | 165/67 |
| 5,657,817 | 8/1997 | Heine et al. | 165/67 |
| 5,704,418 | 1/1998 | Baader et al. | 165/DIG. 311 |

*Primary Examiner*—Ira S. Lazarus
*Assistant Examiner*—Terrell McKinnon
*Attorney, Agent, or Firm*—Raymond L. Cappiellie

[57] ABSTRACT

There is disclosed a cooling module for an automotive vehicle, comprising a condenser having a fluid manifold. The condenser includes at least one condenser end cap facing longitudinally outwards of the edge of the condenser for closing the aperture. The module further includes a radiator including at least one radiator end tank which includes a condenser mounting bracket. The mounting bracket is molded integrally to the radiator end tank and the condenser is mounted directly thereto.

12 Claims, 6 Drawing Sheets

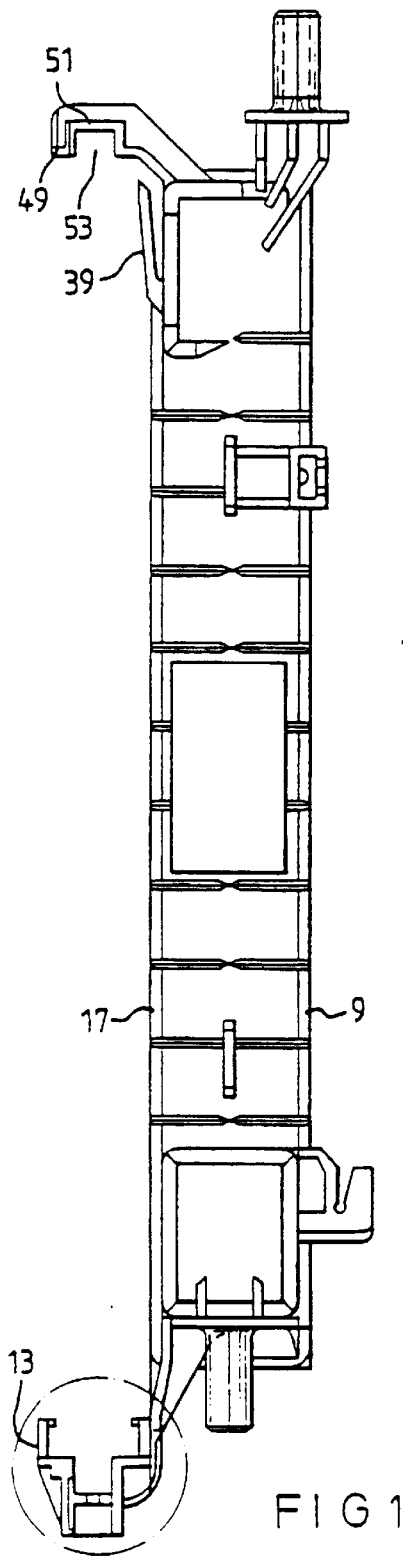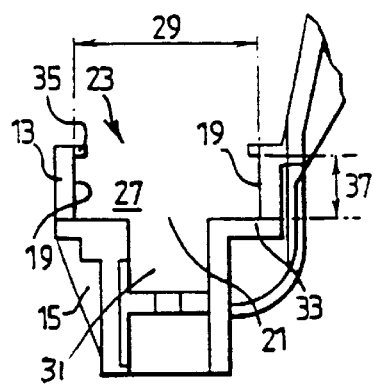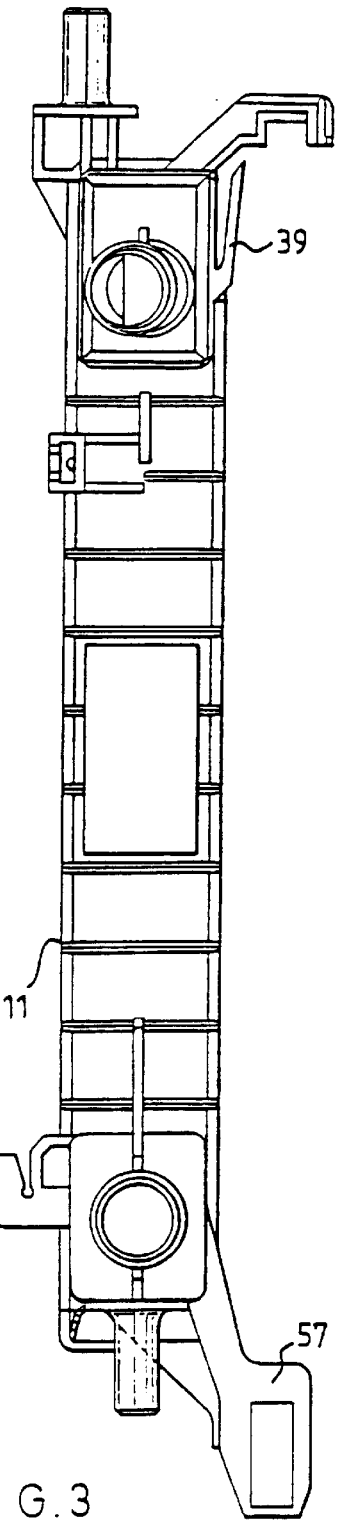
FIG 1
FIG.2
FIG.3

RADIATOR AND CONDENSER ASSEMBLY

FIELD OF THE INVENTION

The invention relates to an improved radiator and condenser assembly for a motor vehicle.

Most motor vehicles now have two major heat exchangers, a radiator used to dissipate the heat from the engine and a condenser forming part of the climate control system for controlling the temperature of air fed into the passenger compartment of the vehicle for the comfort of passengers.

Each heat exchanger essentially comprises a body of a plurality of small tubes spaced apart and parallel to one another through which a fluid may pass allowing heat exchange through the surface of the tubes. Typically the parallel tubes extend between two further tubes or end tanks arranged substantially perpendicular to the plurality of tubes. The arrangement is essentially in the form of a cuboid slab with four elongate substantially rectangular edges and two substantially planar faces. The heat exchangers are not of constant cross section, for example the end tank may be cylindrical or part cylindrical.

The radiator end tanks are typically of moulded plastics material, and include an inlet end tank and a return end tank. The condenser typically has end caps at each end of each end tube, the end caps extending out of the condenser in a direction parallel to the longitudinal axis of the tank. Thus the two transverse edges of the condenser have two end caps.

It is accepted that a practical and effective heat exchange takes place when the condenser and radiator are mounted parallel one to another so that they can sit within the same cooling air flow and one fan can provide the air flow through both heat exchangers. It is well known in the prior art to mount the condenser and radiator together within the engine compartment. Similarly the fan shroud of the fan which provides this air flow is often mounted upon the radiator. Typically the condenser has brackets welded or brazed to its surface and the radiator has flanges which allow the condenser and radiator to be coupled together via the bracket and flange being fastened together.

In one radiator and condenser assembly of the prior art described in U.S. Pat. No. 5,219,016, the condenser and radiator are arranged such that the radiator and condenser may be slid with respect to each other to mount the condenser upon the radiator. The condenser has mounted upon it a pair of J shaped brackets and the radiator has two L shape brackets attached to it. By sliding the radiator with respect to the condenser in two directions the L shape bracket of the radiator is brought into the J shaped bracket of the condenser. In order to hold the condenser and radiator vertically with respect to one another a clamping member with resilient jaws is placed over the upper edges of the condenser and radiator.

SUMMARY OF THE INVENTION

According to the invention there is provided a radiator and condenser assembly, in which the condenser includes at least one end cap facing longitudinally outwards of the edge of the condenser for closing an aperture into the condenser, the end cap being a shaped end cap with an inner body portion of a cross section shaped and sized to cover the condenser aperture and which in use lies closest to the condenser, and an outer head portion of smaller cross section than the body portion such that a shoulder is formed between the head and body portion of the end cap facing longitudinally outwards of the condenser, and the radiator includes at least one radiator end tank which comprises a condenser mounting bracket, the mounting bracket including an end cap receiving housing spaced from the surface of the radiator with walls defining an open faced cavity for receiving the shaped end cap, a first open face of the cavity facing longitudinally inwards of the radiator and a second open face of the cavity facing transversely inwards of the radiator, the cavity defining a body cavity whose cross sectional dimension at least in a direction perpendicular to the face of the radiator is slightly greater than the cross section of the body portion of the shaped end cap and a head cavity of smaller cross section than the body cavity such that a cavity shoulder is defined between the head and body cavity facing towards the first open face of the cavity, the housing walls defining a flange facing inwards of the periphery of the first open face of the cavity, the distance between the cavity shoulder and the flange being slightly greater than the depth of the body portion of the shaped end cap.

In this specification the term 'longitudinal' will be taken to mean a direction generally perpendicular to the edge of the condenser on which the end cap is situated and 'transverse' is to mean any direction substantially parallel to that edge.

Such an assembly allows the radiator and condenser to be mounted upon each other without the need for separate brackets or flanges.

Preferably the condenser mounting bracket is integrally moulded as part of the radiator end tank which means that no extra brackets or flanges need to be attached to the radiator. More importantly the condenser does not need to have anything mounted upon it, or added to it in any way in order for the mounting to be possible. The assembly utilizes a component which needs to be present in the condenser. This means that the manufacture of the condenser can be made simpler and cheaper, because the condenser can be one shot brazed. Also the assembly of the radiator and condenser is quick and simple, thus reducing the cost of the assembly. Because of this, the condenser and radiator can be supplied as a combined module to an assembly plant.

The end cap of the condenser when located within the end cap receiving housing of the radiator limits the relative movement of the radiator and condenser in a longitudinal direction to the difference between the depth of the body portion of the end cap and the distance between the cavity shoulder and the flange. Relative movement of the condenser and radiator in a direction towards and away from each other is limited to the difference between the cross section of the body cavity and the cross section of the body portion of the end cap.

The term slightly greater than is taken to mean large enough to allow the end cap to be relatively easily slotted into the housing but minimizing the difference between the shape of the body portion of the end cap and the body cavity to ensure that there is minimal relative movement permitted. Typically the difference will be in the region of 3 to 6 mm.

The assembly requires some means to prevent the condenser sliding transversely taking the end cap out of the housing. Preferably the radiator is arranged such that both its end tanks include condenser mounting brackets, and the condenser includes two shaped end caps so that the condenser is held firmly between the brackets to prevent relative transverse movement of the radiator and condenser. Preferably the radiator includes releasable locking means which cooperate with the end cap receiving housing for locking the shaped end cap into position within the bracket. This may be achieved by passing a screw threaded member through two jaws or clamp members which urge the walls of the cavity to grip against the shaped end cap when the screw is tightened. Alternatively the walls of the cavity may be arranged to include a resilient detent extending into the cavity and engaged by the end cap when inserted into the cavity to give a snap fit.

Typically the cross section of the body portion of the end cap is largely determined by the cross section of the condenser aperture. Typically the condenser aperture will be circular and therefore conveniently the body portion of the end cap will be cylindrical. In this case since movement into and out of the cavity is required the body cavity has a cross section of a semi-circle. However it will be appreciated by the skilled addressee of the specification that a variety of different cross sections could be used.

In order to allow for simple manufacture and for ease of sliding into and out of the cavity preferably the head portion is of constant cross section.

Although it is possible for the shoulder formed between the head and body of both the shaped end cap and the cavity to be non planar preferably the shoulder is planar and that plane is parallel to the inner face of the shaped end cap.

Preferably therefore the shaped end cap is essentially T shaped in cross section in a longitudinal direction.

Radiator end tanks are made from a variety of materials but typically are of a plastics material. In this case it is preferred that the radiator end tank is moulded from glass filled nylon while condenser end caps are typically metal.

The peripheral flange of the cavity walls does not need to extend about the entire periphery of the cavity. It is sufficient if the flange serves to engage the inner edge of the body portion of the end cap and prevents the end cap from being removable out of the first open face of the cavity.

The movement of the vehicle and the movement of the fan and the air flow cause vibration of the engine components, in particular of the radiator and condenser.

In order to damp vibration between the condenser and radiator preferably the radiator end tank includes a vibration damping device comprising a resilient tongue extending outwards from the surface of the radiator and having a free end forming a biasing member spaced from the surface of the radiator and whose outer surface when unloaded lies at an acute angle to the surface of the radiator, the size and position of the tongue being arranged such that when a further component is mounted adjacent the radiator, the component contacts and urges the biasing member towards the surface of the radiator to spring load the tongue.

The resilient tongue typically is integrally moulded with the radiator end tank thus providing an integral vibration damping device which does not need to be separately mounted between the radiator and an adjacent component during assembly. This cuts down on assembly time and therefore cost. The preferred material of the radiator end tank is glass reinforced nylon which is resilient enough to provide vibration damping.

The position and length of the biasing member is arranged such that the adjacent component contacts and bears against its outer surface to spring load it.

The thickness of the biasing member is chosen to give the required resilience which depends on the weight of the adjacent component and the expected amplitude of vibration.

The vibration damping device may advantageously be used to damp vibration between a radiator and a condenser and/or a radiator and a fan shroud.

BRIEF DESCRIPTION OF THE DRAWINGS

Four embodiments of radiator and condenser assemblies in accordance with the present invention will now be described, by way of example only, with reference to the accompanying drawings, in which:

FIG. 1 is an end elevation of the outer edge of the return tank of a radiator of a first radiator and condenser assembly;

FIG. 2 is an enlarged view of part of FIG. 1;

FIG. 3 is an end elevation of the outer edge of the radiator inlet tank of the first radiator and condenser assembly;

DESCRIPTION OF THE PREFERRED EMBODIMENTS

Figure 4:
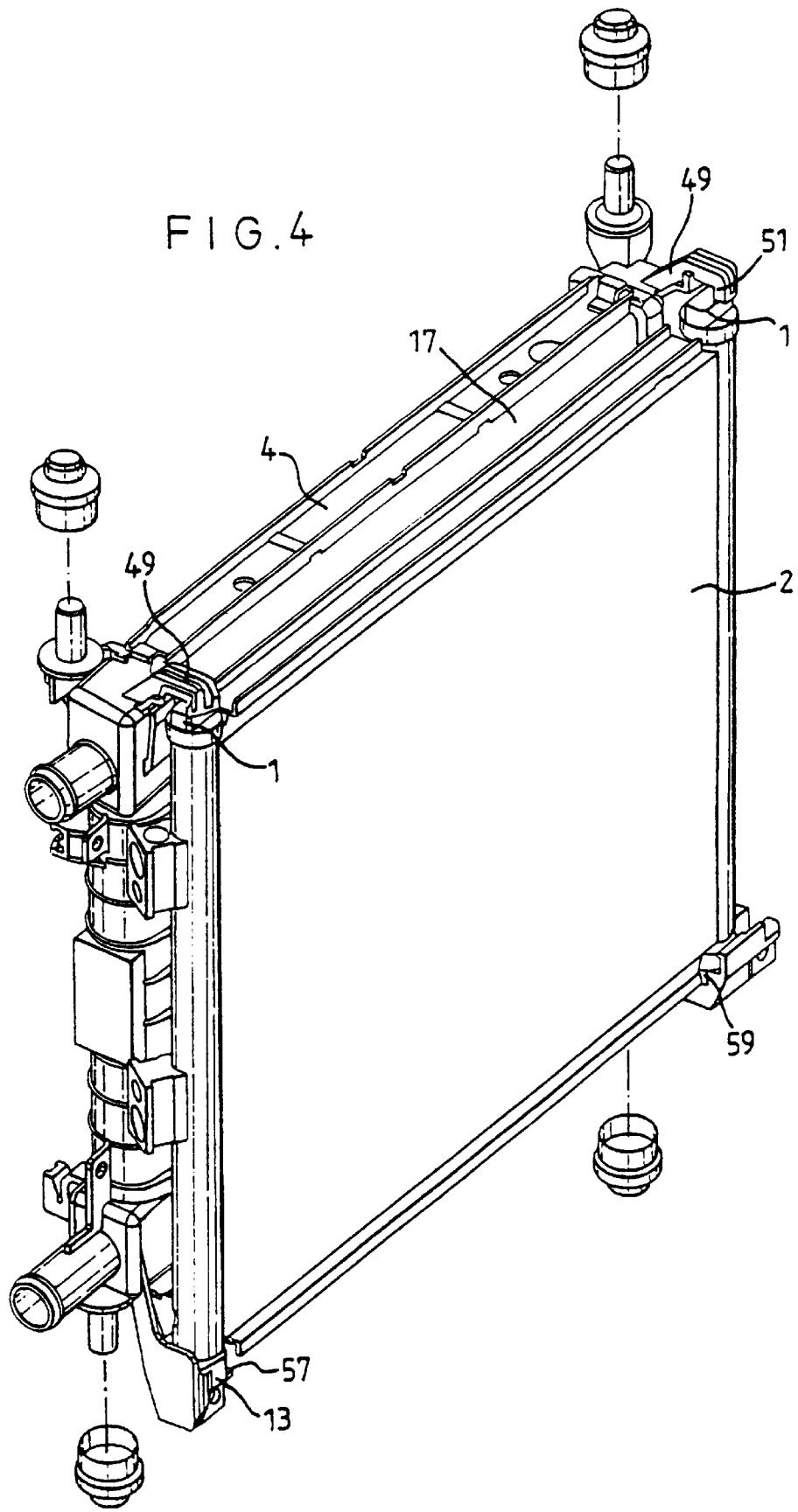
FIG. 4 is an exploded perspective view of the first radiator and condenser assembly.
Figure 5:
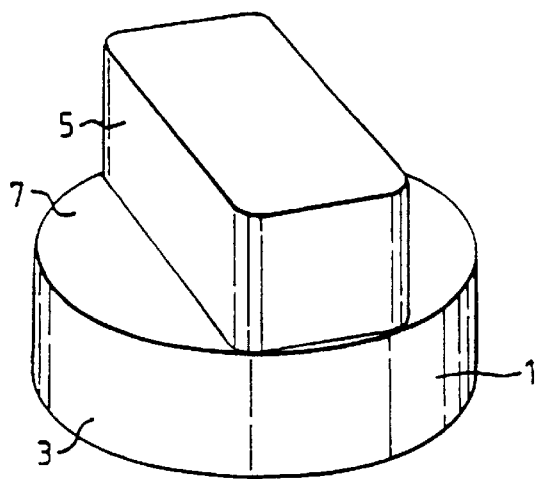
FIG. 5 is a perspective view of a shaped end cap of the first radiator and condenser assembly.
Figure 6:
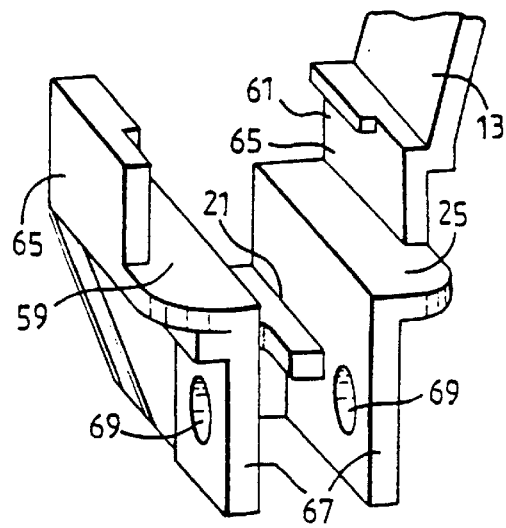
FIG. 6 is a perspective view of the condenser mounting bracket of the return radiator end tank illustrated in FIGS. 1 and 2.

A first embodiment of a radiator and condenser assembly is shown in FIGS. 1 to 11. Detail of the radiator end tanks are shown FIGS. 1 and 3 but the rest of the radiator is not illustrated. Similarly although the condenser is illustrated in FIG. 4 no further details of the condenser will be described other than the end cap. The rest of the radiator and the condenser are conventional and their structure would be apparent to the skilled addressee of the specification. In use the condenser 2 and radiator 4 lie parallel to one another. The condenser includes two transverse edges each of which has two end caps facing longitudinally outwards of the edge of the condenser. In FIGS. 1, 3 and 4 the longitudinal direction is vertical and transverse is the axis extending perpendicular to the page. Thus the condenser 2 includes four end caps 1, facing longitudinally outwards of the edge of the condenser for closing an aperture (not shown) into the condenser, each of the end caps 1 being shaped end caps as shown in FIG. 5 with an inner body portion 3 which in use lies closest to the condenser having a cross section shaped and sized to cover the condenser aperture (not shown) and an outer head portion 5 of smaller cross section than the body portion 3 such that a shoulder 7 is formed between the head portion 5 and body portion 3 of the end cap 1 facing longitudinally outwards of the condenser. The radiator includes two radiator end tanks 9 and 11 each comprising a condenser mounting bracket 13 including an end cap receiving housing 15 spaced from the surface 17 of the radiator with walls 19 defining an open faced cavity 21 for receiving the shaped end cap 1. A first open face 23 of the cavity 21 faces longitudinally inwards of the radiator and a second open face 25 faces transversely inwards of the radiator. The cavity 21 defines a body cavity 27 whose cross sectional dimension 29 in the direction perpendicular to the face of the radiator 17 (ie in the plane of the paper) is just greater than the cross section of the body portion 3 of the shaped end cap 1. The cavity 21 also defines a head cavity 31 of smaller cross section than the body cavity 27 such that a shoulder 33 is defined between the head and body cavity facing towards the first open face 23 of the cavity. The housing walls 13 defines a flange 35 facing inwards of the periphery of the first open face 23 of the cavity, the distance 37 between the cavity shoulder 33 and the flange 35 being slightly greater than the depth of the body portion 3 of the shaped end cap.

Figure 10:
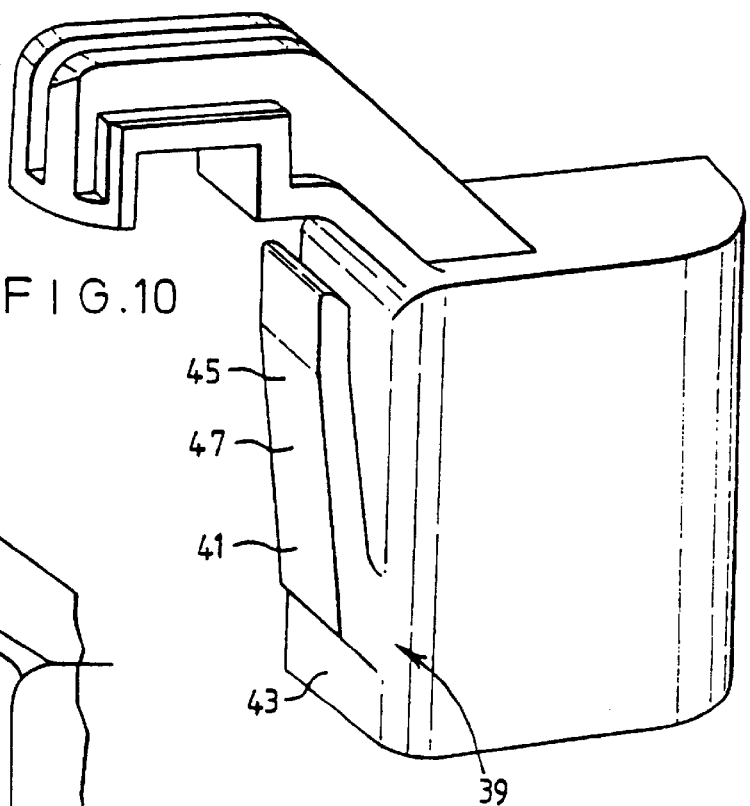
FIG. 10 is an enlarged perspective view of a vibration damping device of the first radiator and condenser assembly.

The assembly also comprises a vibration damping device 39 to damp vibration between the radiator and the condenser lying adjacent the radiator and damping device 39 is illustrated in more detail in FIG. 10 and comprises a resilient tongue 41 extending outwards of the surface 43 of the radiator (here the radiator end tank) and having a free end 45 forming a biasing member 47 spaced from the surface 43 of the radiator and whose outer surface when unloaded lies at an acute angle 43 from the radiator (best seen in FIG. 1) the size and position of the tongue 41 being arranged such that when the further component (in this case the condenser) is mounted adjacent the radiator the component contacts and pushes the biasing member 47 towards the surface 43 to spring load the tongue 41. In this example the thickness of the biasing member 47 is 3 mm and the distance of the free end 45 from the surface 43 of the radiator is 4.8 mm.

The radiator includes two radiator end tanks 9 and 11, a return tank 9 and an inlet tank 11. The two tanks are not identical but both are moulded from a coolant resistant 30% glass reinforced heat stabilized type nylon.

Although the condenser includes four shaped end caps of the form shown in FIG. 5 each radiator tank includes one only condenser mounting bracket 13 at one end of the tank, in this case the lower end of the tank. It should be noted that it is possible to mount the radiator in a number of different positions within a car and the end tanks may not always be mounted vertically but typically they will be mounted vertically. Each tank 9 includes an upper locating bracket 49 including a slot 51 for receiving the head portion 5 of the end cap. Conveniently the slot 51 has a cross section similarly shaped to the cross section of the head cavity but it will be appreciated by the skilled addressee of the specification that since the end cap to be located in slot 51 does not have to have the same shape as that which is to be mounted in the condenser mounting bracket the slot 51 could be of different dimensions.

Figure 11:
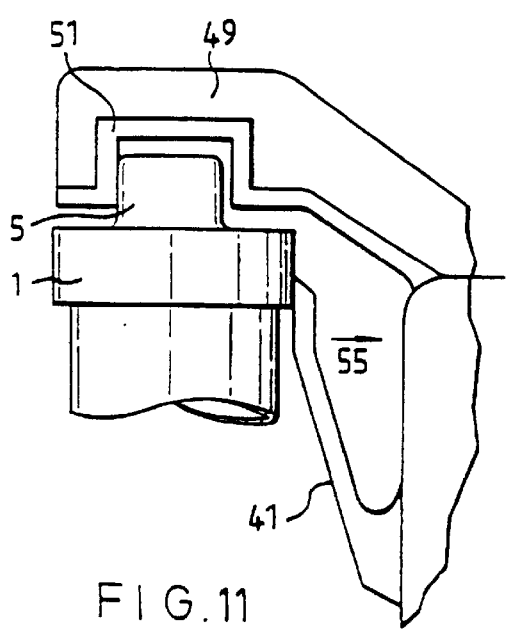
FIG. 11 is a section through the vibration damping device of FIG. 10 with the end cap in position.

The slot 51 is arranged so that its open mouth 53 is aligned and facing the first open face 23 of the cavity such that when both end caps of the condenser at one end of the condenser are in place within the condenser mounting bracket and the locating bracket the condenser lies in a position parallel and spaced from the radiator. When in this position as shown in FIG. 11 the end cap 1 bears against the outer surface of the tongue 41 and urges it in a direction 55 towards the surface of the radiator. This thus provides an integral (since it is moulded with the rest of the radiator end tank) vibration damping device which damps any vibration between the condenser and radiator without any further components needing to be added.

Figure 7:
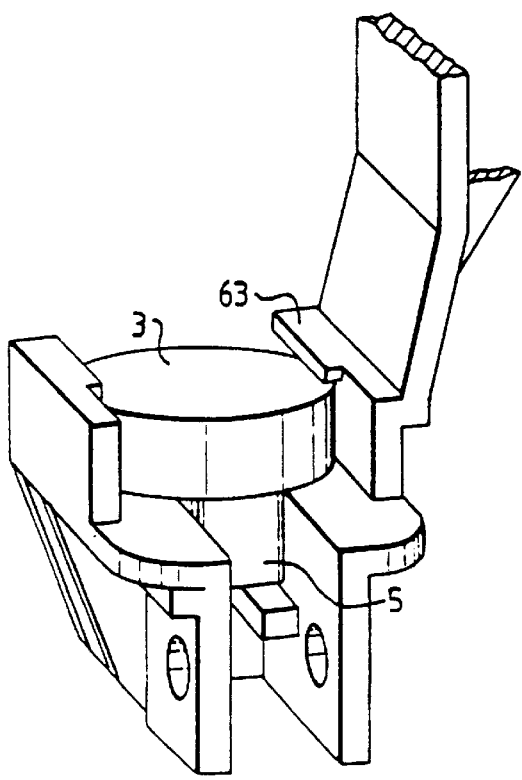
FIG. 7 is a perspective view of the condenser mounting bracket of FIG. 6 showing the shaped end cap in position.

It can be seen by reference to FIGS. 6 to 9 that the condenser mounting bracket 13 for return radiator tank 9 is slightly different to the condenser mounting bracket 57 forming part of inlet tank 11. Condenser mounting bracket 13 is shown in more detail in FIGS. 6 and 7. Here the cavity 21 is in the form of an open ended slot of constant T shaped cross section. The slot 59 has a body cavity 61 of cross section slightly greater than the diameter of the body portion 3 of the end cap. Since the slot 59 is open ended the condenser end cap could slide into the cavity transversely in two directions. When in position as shown in FIG. 7 the end cap is restrained from moving in a longitudinal direction by the flange 63 and shoulder 25 and restrained from movement towards and away from the radiator by the side walls 65. The cap is restrained in a transverse direction is by tightening the walls 65 to the end cap by use of extension jaws 67 which extend from the walls below the cavity and include aligned cylindrical bores 69 through which a bolt or screw threaded member (not shown) can be passed. Tightening of nuts on the screw threaded member or bolt tightens the jaws 67 together to pull in the walls 65 to grip against the edge of the end cap and thus hold it in position.

Figure 8:
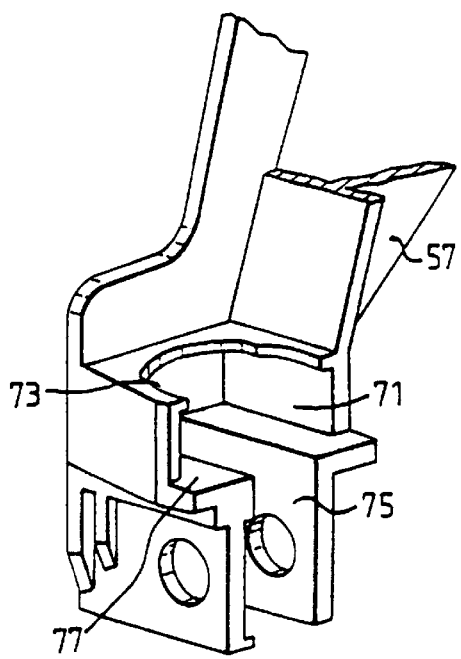
FIG. 8 is a perspective view of the condenser mounting bracket of inlet radiator tank illustrated in FIG. 3.
Figure 9:
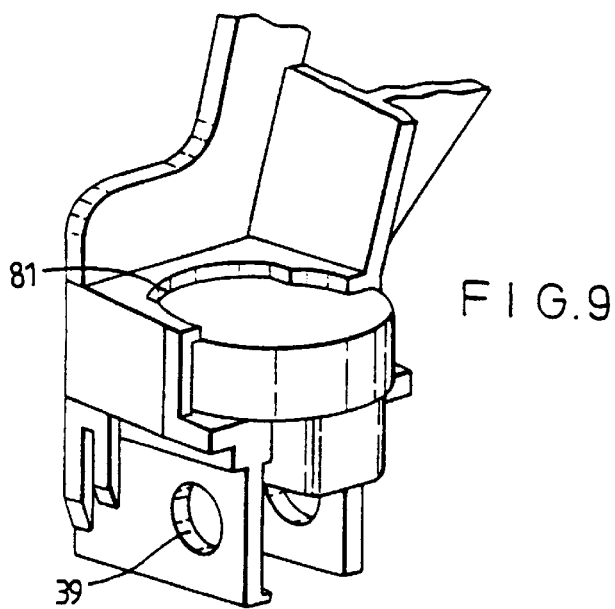
FIG. 9 is a perspective view of the condenser mounting bracket of FIG. 8 showing an end cap in position.

The alternative form of condenser mounting bracket 57 is illustrated in FIGS. 8 and 9. This is arranged to accommodate the same shaped end cap 1 and includes a cavity 71 which comprises a semi-cylindrical body cavity 73 of a diameter just greater than the diameter of the body portion of the end cap and a cuboid body cavity 75 for receiving the head portion of the end cap of smaller cross section than the diameter of the body cavity 73 so that a shoulder 77 is formed. When the end cap is in position as shown in FIG. 9 it is retained by passing a screw through aligned bores 79. The limit of transverse movement is defined by the rear face 81 of the body cavity 73.

The reason that the two different body condenser mounting brackets are used together is to allow for the introduction of the condenser into position. The condenser is slid transversely from the return end 9 of the radiator tank through the open ended slots 59 and 51 until two of the end caps locate in condenser mounting bracket 57 and the locating bracket 49 of inlet tank 11. This retains the condenser in position.

Figure 12:
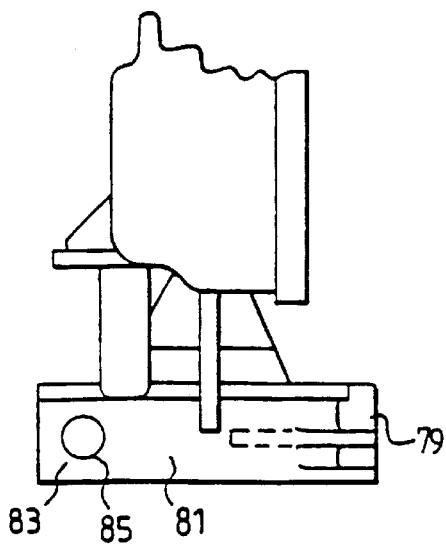
FIG. 12 is a side elevation of a second embodiment of condenser mounting bracket in accordance with the invention.
Figure 13:
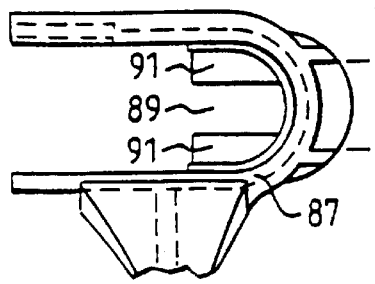
FIG. 13 is a plan view of the condenser mounting bracket of FIG. 12.

FIGS. 12 and 13 illustrate a second embodiment of condenser mounting brackets suitable for use in a radiator and condenser assembly in accordance with the invention. The bracket 79 has walls 81 which extend transversely to form jaws 83 having aligned cylindrical bores 85 for gripping an end cap when in position. The condenser mounting bracket 79 defines a semi-cylindrical body cavity 87 and slot 89 accommodates the head portion that defines shoulders 91.

Figure 14:
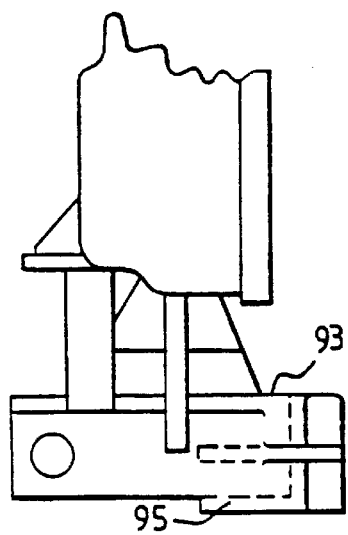
FIG. 14 is a side view of a third embodiment of condenser mounting bracket.
Figure 15:
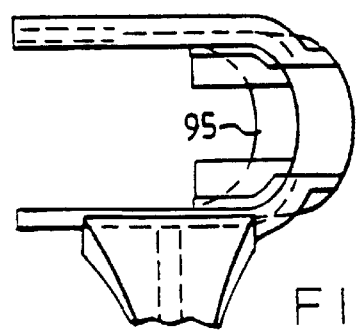
FIG. 15 is a plan view of the condenser mounting bracket of FIG. 14.
Figure 16:
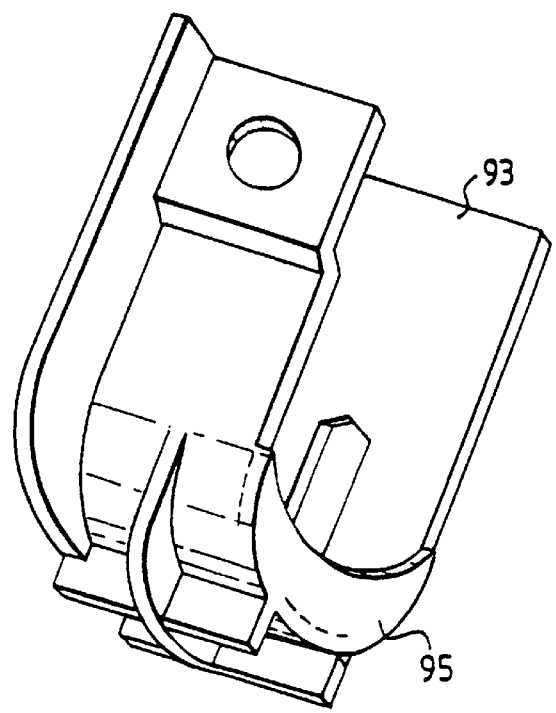
FIG. 16 is a perspective view of the condenser mounting bracket of FIG. 14.

A third embodiment of condenser mounting bracket is illustrated in FIGS. 14 to 16. The condenser mounting bracket 93 is similar to that of the second embodiment but which further includes lower arcuate support web 95 which supports the outer face of the head portion of the end cap and provides a strengthening web for the bracket 93.

Figure 17:
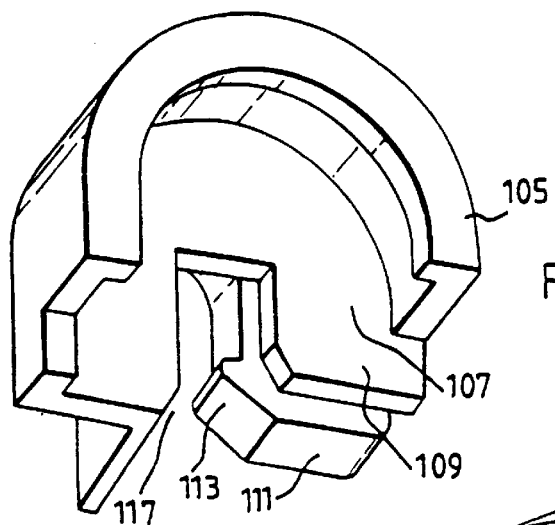
FIG. 17 is a perspective view from the cavity open face of a fourth embodiment of condenser mounting bracket.
Figure 18:
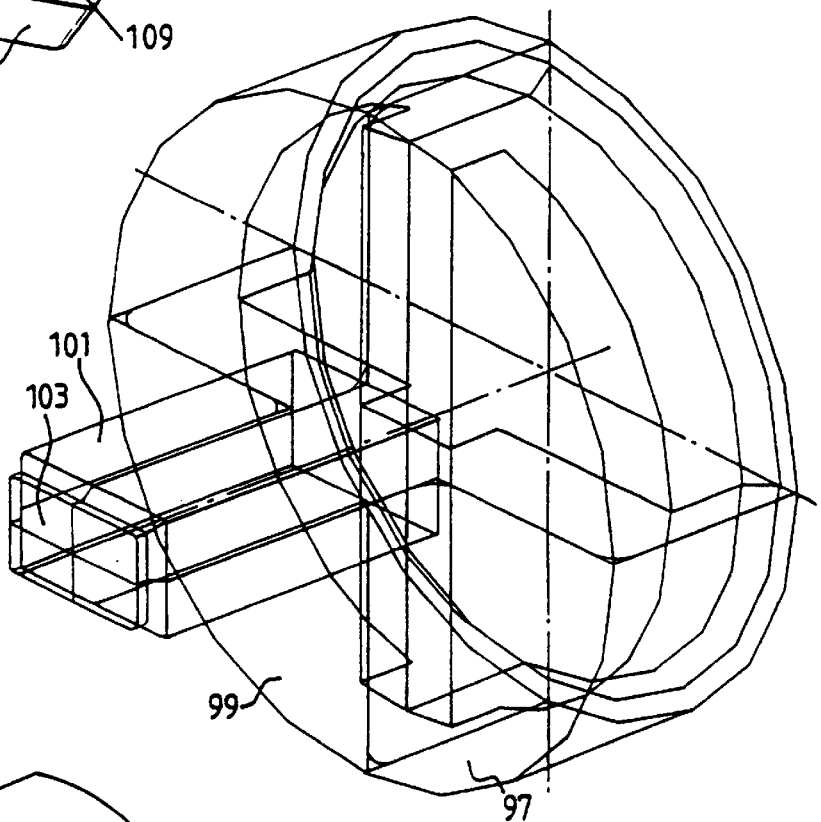
FIG. 18 is a perspective view of a shaped end cap for use with the condenser mounting bracket illustrated in FIG. 17; and, FIG. 19 is a perspective view of the condenser mounting bracket of FIG. 17 illustrating the position of the condenser end cap.
Figure 19:
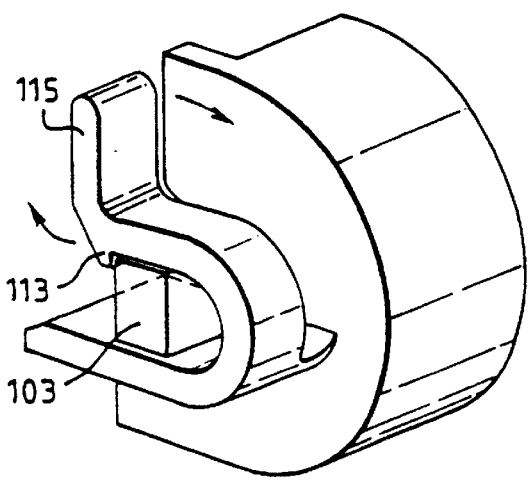

A fourth embodiment is illustrated in FIG. 17 to 19. In this embodiment the end cap 97 is different from that used in the previous three embodiments. The end cap 97 has a cylindrical body portion 99 and a cuboid head portion 101 of smaller cross section than body portion 99. The head portion 101 includes at its outer end projection 103 to form a locking pin. The condenser mounting bracket 105 has a cavity comprising a body cavity 107 which is semi-cylindrical with a large shoulder 109 which extends to the edge of head portion 101 of the end cap. A third web 111 forms a clip. This is in the form of a projecting nose 113 and extending from the nose 113 a finger 115. The web 111 is narrow and the material of the nylon is resilient but deformable. The nose 113 projects across the opening 117 into the head cavity and together the pin 103 and nose 113 form a snap fit catch. To release the end cap from the mounting bracket 105 the finger 115 is pushed in a direction clockwise as seen in FIG. 19 thus rotating nose 113 in a clockwise direction out of engagement with pin 103 thus allowing the pin to be removed.

It will be appreciated that other forms of snap fit can be utilized to lock the condenser end cap into the condenser mounting bracket.

We claim:

1. A radiator and condenser assembly, in which the condenser includes at least one end cap facing longitudinally outwards of the edge of the condenser for closing an aperture into the condenser, the end cap being a shaped end cap with an inner body portion of a cross section shaped and sized to cover the condenser aperture and which in use lies closest to the condenser, and an outer head portion of smaller cross section than the body portion such that a shoulder is formed between the head and body portion of the end cap facing longitudinally outwards of the condenser, and the radiator includes at least one radiator end tank which comprises a condenser mounting bracket, the mounting bracket including an end cap receiving housing spaced from the surface of the radiator with walls defining an open faced cavity for receiving the shaped end cap, a first open face of the cavity facing longitudinally inwards of the radiator and a second open face of the cavity facing transversely inwards of the radiator, the cavity defining a body cavity whose cross sectional dimension at least in a direction perpendicular to the face of the radiator is slightly greater than the cross section of the body portion of the shaped end cap, and a head cavity of smaller cross section than the body cavity such that a shoulder is defined between the head and body cavity facing towards the first open face of the cavity, the housing walls defining a flange facing inwards of the periphery of the first open face of the cavity, the distance between the cavity shoulder and the flange being slightly greater than the depth of the body portion of the shaped end cap.

2. An assembly according to claim 1, in which the condenser includes two shaped end caps and both the radiator end tanks include a condenser mounting bracket.

3. An assembly according to claim 1, in which the radiator includes releasable locking means for locking the end cap into position within the bracket.

4. An assembly according to claim 3, in which the releasable locking means comprises a screw threaded means cooperating with jaws forming part of the housing such that tightening of the screw tightens the walls of the cavity about the shaped end cap.

5. An assembly according to claim 3, in which the releasable locking means comprises a resilient detent extending into the cavity and engaged by the end cap when inserted into the cavity to give a snap fit.

6. An assembly according to claim 5, in which the body of each shaped end cap is cylindrical and the head of the or each shaped end cap is of substantially constant cross section.

7. An assembly according to claim 6, in which the shoulder of the end cap is planar.

8. An assembly according to claim 7, in which the end cap is essentially T-shaped in cross section.

9. An assembly according to claim 1, in which the radiator end tank is moulded from glass filled nylon.

10. An assembly according to claim 1, in which the end cap is metallic.

11. An assembly according to claim 1, in which the radiator includes a vibration damping device comprising a resilient tongue extending outwards from the surface of the radiator and having a free end forming a biasing member spaced from the surface of the radiator, the size and position of the tongue being arranged such that when a further component is mounted adjacent the radiator, the component contacts and urges the biasing member towards the surface of the radiator to spring load the tongue.

12. A cooling module for an automotive vehicle, comprising:

a condenser having a fluid manifold with an aperture therein, said condenser including at least one condenser end cap facing longitudinally outwards of the edge of the condenser for closing said aperture, the condenser end cap having:
an inner body portion of a predetermined configuration so as to cover the condenser aperture and which in use lies closest to the condenser, and
an outer head portion of smaller cross section than the inner body portion such that a shoulder is formed between the head and body portion of the end cap;

a radiator including at least one radiator end tank which including a condenser mounting bracket, the mounting bracket including a condenser end cap receiving housing spaced from the radiator, said housing including:
walls defining an open faced cavity for receiving the condenser end cap, a first open face of the cavity facing longitudinally inwards of the radiator and a second open face of the cavity facing transversely inwards of the radiator,
said open faced cavity defining:
a body cavity having a cross-sectional dimension in a direction perpendicular to the face of the radiator being greater than the cross section of the body portion of the condenser end cap, and
a head cavity of smaller cross section than the body cavity such that a shoulder is defined between the head and body cavity facing towards the first open face of the cavity,
said housing walls further defining a flange facing inwards of the periphery of the first open face of the cavity, the distance between the cavity shoulder and the flange being greater than the depth of the body portion of the condenser end cap.

* * * * *